United States Patent [19]
Maurice

[11] 3,915,272
[45] Oct. 28, 1975

[54] DISK HOLDERS, NOTABLY FOR CLUTCHES AND BRAKES OF CHANGE-SPEED MECHANISMS

[75] Inventor: Jean Maurice, Billancourt, France

[73] Assignees: Regie Nationale des Usines Renault, Billancourt; Automobiles Peugeot, Paris, both of France

[22] Filed: Feb. 11, 1974

[21] Appl. No.: 441,345

[30] Foreign Application Priority Data
Feb. 13, 1973 France .............................. 73.04973

[52] U.S. Cl. ............................... 192/70.2; 188/71.5
[51] Int. Cl.² ......................................... F16D 13/52
[58] Field of Search ............ 192/18 R, 18 A, 70.19, 192/70.2; 188/71.5

[56] References Cited
UNITED STATES PATENTS

| | | | |
|---|---|---|---|
| 3,744,605 | 7/1973 | Piret | 188/71.5 X |
| 3,744,606 | 7/1973 | Bucksch | 192/18 A X |
| 3,747,727 | 7/1973 | Dach et al. | 192/70.2 X |

*Primary Examiner*—Allan D. Herrmann
*Attorney, Agent, or Firm*—Stevens, Davis, Miller & Mosher

[57] ABSTRACT

A disk carrier drum consisting of sheet-metal, for clutches and brakes, notably in change-speed mechanisms of automotive vehicles and the like comprises in its cylindrical surface a plurality of peripheral spaced apertures extending in the axial direction, and bearing surfaces engageable by the radial extensions of the disks. These bearing surfaces are parallel to the drum axis and the cylinder corresponding to the mean diameter of the drum intersects the bearing surfaces substantially in the middle thereof.

5 Claims, 8 Drawing Figures

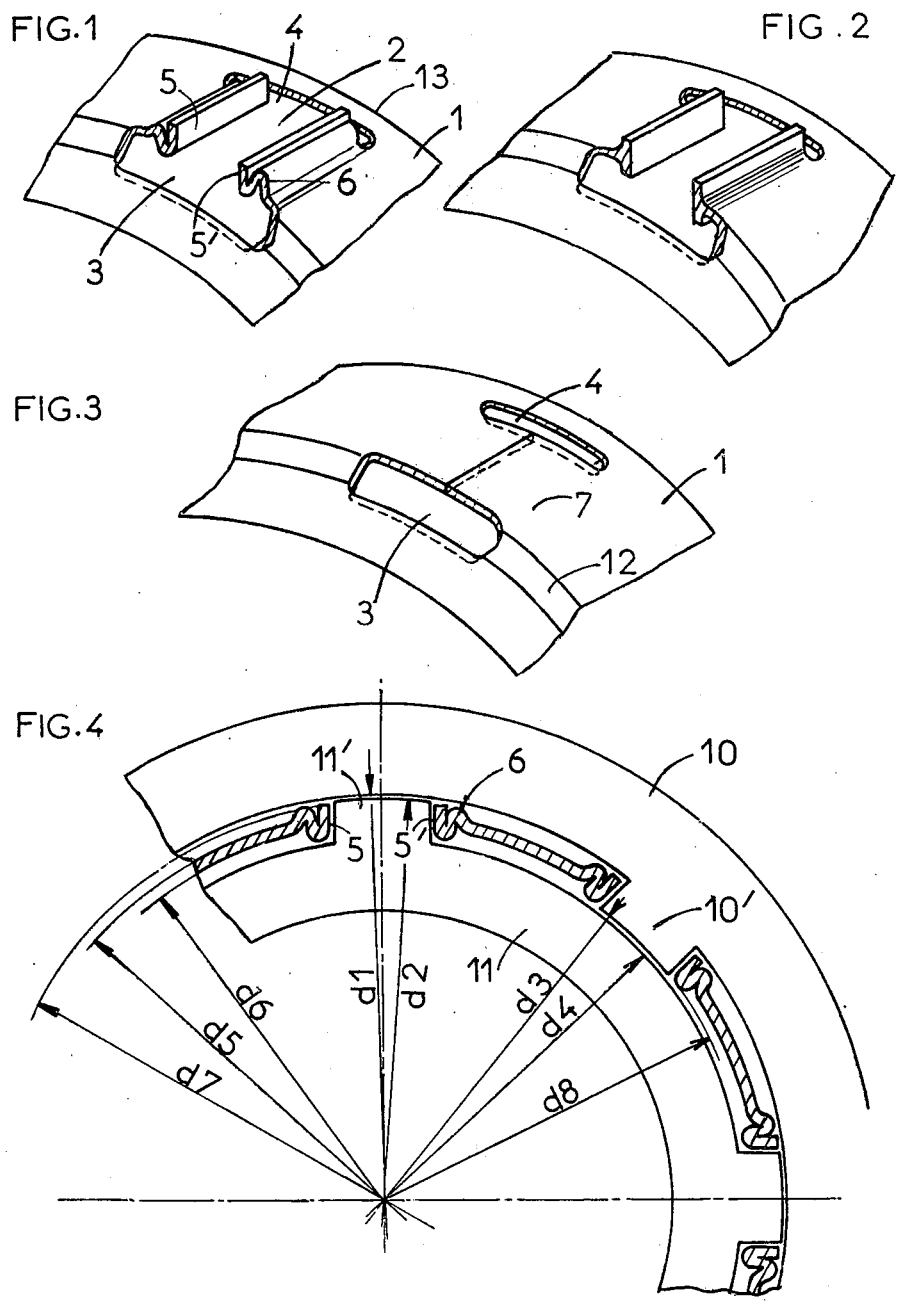

DISK HOLDERS, NOTABLY FOR CLUTCHES AND BRAKES OF CHANGE-SPEED MECHANISMS

The present invention relates to improvements in sheet-metal disk-supporting drums intended notably for clutches and brakes of transmission or change-speed mechanisms.

As a rule, a change-speed mechanism comprises a friction-disk stacking constituting clutch or brake means. The function of such clutches and brakes is to render certain rotary members and, more particularly in the case of epicyclic transmission mechanisms, the component elements of the planetary gear trains, such as planet gears, internally-toothed annular gears, planet-carriers, rotatably rigid with the input shaft, or to hold one or more of these component elements against movement. Thus, the friction disks are rotatably rigid with a disk carrier permitting however their axial movement, the latter being necessarily limited by a thrust bearing or member capable of withstanding the axial clamping effort of said disks.

A typical embodiment of this disk carrier is well known; it comprises a notched or castellated sheet-metal drum or pan the contour of which is obtained by pressing or stamping a cylindrical drum. The axial thrust bearing member of the disks consists in this case of a resilient stop ring fitting in a groove machined to this end in the inner wall of the drum.

However, this arrangement is attended by a number of difficulties.

Thus, machining the grooves by removing material from the notched or castellated drum constitutes a difficult operation for the tools are exposed to severe shocks as they engage the notches in succession; removing the many burrs resulting from this machining operation constitutes another long and tedious operation for such burrs lie on the side faces and bottom faces of said notches. Obviously, this burr-removing operation cannot be performed at a high production rate.

The use of spring rings for locking the disks in position is not a very reliable method either, since these rings may become unseated under the repeated thrust forces implemented in actual service. To minimize this risk, it is customary to machine the groove with the greatest accuracy, especially as far as the perpendicularity of the groove lateral faces to the drum axis is concerned.

A known attempt for solving these problems consists in using plain sheet-metal drums having substantially rectangular spaced apertures formed in their surface in the axial direction, said apertures being adapted to receive corresponding radial extensions provided at the outer periphery of each disk. The disk bearing faces are then obtained, according to a first embodiment, by flanging a metal plate edge radially on one or the other side of the outer drum surface. These flanged edges parallel to the drum axis are exposed to flexion stress as a consequence of the disk driving effort.

The thickness of said drum and of the flanged edges, which is necessary for withstanding these flexion stresses, implies the use of relatively long radii for flanging the sheet-metal edges, which are therefore not usable as bearing surfaces and increase unduly the radial over-all dimension of the assembly.

It is the chief object of the present invention to avoid these various inconveniences by providing a disk carrier wherein the cylinder formed by the mean drum diameter intersects said bearing surfaces substantially in the middle thereof.

The resultant of the disk driving efforts is thus made tangent to the aforesaid cylinder and its point of application lies on this cylinder. The use of drums made from thinner sheet-metal stock is thus possible insofar as the flexion stresses exerted on the disk bearing surfaces are eliminated.

Furthermore, this reduction in the drum thickness permits reducing accordingly the radius of curvature of the bent portions joining the bearing surfaces to the drum, and consequently the over-all radial dimensions of the assembly.

Other features and advantages of this invention will appear more clearly as the following description proceeds with reference to the accompanying drawings, in which:

FIG. 1 is a fragmentary perspective view of a typical embodiment of a disk carrier drum, before fitting the disk thereon;

FIG. 2 is a fragmentary perspective view showing a modified form of embodiment of the drum, also before fitting the disk thereon;

FIG. 3 is a fragmentary perspective view of a disk carrier drum during the making thereof, and before forming the disk bearing surfaces;

FIG. 4 is a fragmentary cross-sectional view of the disk carrier drum;

Figure 5:
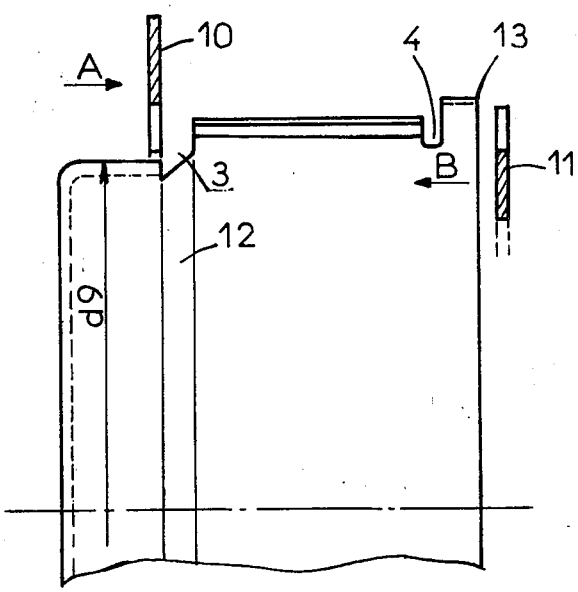
FIG. 5 is a fragmentary longitudinal section of the disk carrier drum, during the mounting of a disk thereon.

Referring first to FIG. 1 of the drawings, there is shown at 1 one portion of a sheet-metal drum comprising a substantially rectangular aperture 2 obtained by punching a pair of holes 3 and 4 in the peripheral direction of the drum for limiting the aperture 2 in the peripheral direction of the drum, and by a pair of bearing surfaces 5, 5' parallel to the drum axis and limiting the aperture 2 in the peripheral direction. These bearing surfaces 5 and 5' are obtained by forming at least one fold 6 in the drum sheet material, the developed length of each fold corresponding substantially to the length of the circular arc comprising the surface area 7 split in the axial direction between the punched holes 3 and 4 (see FIG. 3).

Now the developed length of these folds may correspond substantially to the width of said punched holes 3 and 4. According to this invention, the corresponding folding step is performed in such a manner that the bearing surfaces 5 and 5' have a radial height greater than the thickness of the drum plate and are cut centrally of the cylinder corresponding to the mean diameter of said drum. This feature affords a convenient solution to the above-mentioned problem, that is, the possibility of obtaining disk bearing surfaces free of flexion stresses.

FIG. 2 illustrates another form of embodiment of the invention, which is obtained for example by moulding or according to the sintering or powder metallurgy technique.

FIG. 4 illustrates the relative arrangement of the outer and inner disks with respect to said drum. Apertures such as 2 carry along the outer disks 10 and the inner disks 11 by turns. This type of disk carrier drum permits the use of the disks according to the following arrangements:

the diameter $d4$ of the inner disks 11 is substantially equal to the diameter $d3$ of the circle inscribing the apices of the radial extensions 10' of the outer disks 10;

the inner diameter $d1$ of the outer disks 10 is substantially equal to the diameter $d2$ of the circle inscribing the tops or outer edges of the radial extensions 11' of the inner disks 11. Moreover, the diameter $d2$ of the circle inscribing the outer edges of the radial extensions 11' of inner disks 11 is greater than the diameter $d5$ of the circle surrounding the outer surface of the drum and is substantially equal to the diameter $d7$ of the largest circle inscribing the ends of the disk bearing surfaces; the diameter $d3$ of the circle inscribing the inner edges of the radial extensions 10' of the outer disks 10 is smaller than the diameter $d6$ of the circle inscribing the inner surface of the drum and substantially equal to the diameter $d8$ of the smallest circle containing the ends of the bearing surfaces of said disks.

In FIG. 5 the method of mounting the disks 10 and 11 is illustrated. The outer disks 10 are mounted in the direction of the arrow A. The outer diameter $d9$ of the drum bottom should be inferior to the above-defined diameter $d3$. The punched hole 3 clears a stepped surface 12 of the drum.

Figure 6:
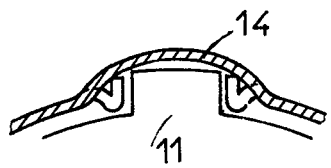
FIG. 6 is a fragmentary detail view taken in the direction of the arrow B of FIG. 5, and FIGS. 7 and 8 are other fragmentary views taken in the direction of the arrow B of FIG. 5, showing two typical embodiments of axial disk stop means.

The inner disks 11 are mounted in the direction of the arrow B after producing a local distortion of the drum at 14 (FIG. 6) between the punched hole 4 and the drum edge 13.

Figure 7:
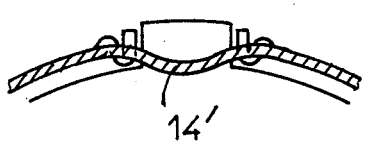
Figure 8:
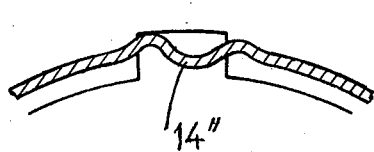

FIGS. 7 and 8 illustrate two typical examples of distortions 14' and 14'' of the drum portion extending between the punched hole 4 and the end edge 13 of the drum, after inserting the inner disk 11 in position. This distortion provides an axial abutment for the set of disks constituting the clutch.

If desired and without departing from the scope of the invention a number of such deformations or distortions may be used holding against angular movement another member of the mechanism, for example a toothed annulus or a bearing race. In this case the friction disks are held in the axial direction conventionally by setting or by using a distance-piece.

Although specific forms of embodiment of the invention have been described hereinabove and illustrated in the accompanying drawings, it will readily occur to those skilled in the art that various modifications and changes may be brought thereto without departing from the scope of the invention as set forth in the appended claims.

What is claimed as new is:

1. Apparatus for clutches and brakes of change-speed mechanisms, comprising: a drum having a predetermined thickness and including a cylindrical surface having formed, in the axial direction of said drum, through said cylindrical surface a plurality of spaced rectangular apertures, and a plurality of pairs of disk bearing surfaces having portions disposed externally and internally of said cylindrical surface, each pair of disk bearing surfaces limiting one of said apertures, said bearing surfaces being parallel to the drum axis and having a radial height greater than the drum thickness, wherein a cylinder corresponding to the mean diameter of said drum intersects said bearing surfaces substantially in the middle thereof; and, a set of disks having, respectively, first and second radial extensions which co-act with said bearing surfaces.

2. Apparatus according to claim 1 wherein said drum comprises sheet metal and two punched holes on either side of said drum which limit one of said plurality of apertures, and wherein one of said disk bearing surfaces comprises a fold formed in said sheet metal material, the sum of the developed length of said fold corresponding to the length of a circular arc forming a portion of said cylindrical surface and extending between said punched holes.

3. Apparatus according to claim 1 wherein said set of disks comprises, relative to said drum, an inner disk having an outer diameter in which said first radial extensions extend outwardly from said outer diameter and have outer edges, and an outer disk having an inner diameter in which said second radial extensions extend inwardly from said inner diameter and have inner edges, wherein said outer diameter is substantially equal to the diameter of a first circle containing said inner edges and said inner diameter is substantially equal to the diameter of a second circle containing said outer edges.

4. Apparatus according to claim 3 wherein said cylindrical surface comprises inner and outer sides and said bearing surfaces comprise inner edges and outer edges, wherein the diameter of said second circle containing said outer edges of said first radial extensions is greater than the diameter of a third circle containing said outer side of said cylindrical surface and substantially equal to the diameter of a major circle containing said outer edges of said bearing surfaces, and wherein the diameter of the first circle containing said inner edges of said second radial extensions is smaller than the diameter of a fourth circle containing said inner side of said cylindrical surface and substantially equal to the diameter of a smaller circle containing said inner edges of said bearing surfaces.

5. Apparatus according to claim 1 wherein said drum further comprises, for said set of disks, an axial thrust abutment comprising a distortion of a drum portion adjacent to one of said rectangular apertures, said drum portion being initially shaped to permit engagement of one of the radial extensions of one of said disks in said one of said apertures.

* * * * *